(12) United States Patent
Yoshioka et al.

(10) Patent No.: US 12,439,416 B2
(45) Date of Patent: Oct. 7, 2025

(54) TERMINAL AND RADIO COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 511 days.

(21) Appl. No.: 17/788,843

(22) PCT Filed: Dec. 25, 2019

(86) PCT No.: PCT/JP2019/051015
§ 371 (c)(1),
(2) Date: Jun. 24, 2022

(87) PCT Pub. No.: WO2021/130941
PCT Pub. Date: Jul. 1, 2021

(65) Prior Publication Data
US 2023/0036466 A1 Feb. 2, 2023

(51) Int. Cl.
*H04W 72/23* (2023.01)
(52) U.S. Cl.
CPC .................................. *H04W 72/23* (2023.01)
(58) Field of Classification Search
CPC ..... H04W 72/23; H04W 72/20; H04W 16/14; H04W 72/0453; H04W 72/12
See application file for complete search history.

(56) References Cited

U.S. PATENT DOCUMENTS

| | | | | |
|---|---|---|---|---|
| 2017/0041947 A1* | 2/2017 | Kim | ...................... | H04W 16/14 |
| 2018/0013533 A1* | 1/2018 | Yang | ...................... | H04L 1/1887 |
| 2020/0389874 A1* | 12/2020 | Lin | ...................... | H04W 72/23 |
| 2022/0225393 A1* | 7/2022 | Gao | ...................... | H04L 5/0053 |

FOREIGN PATENT DOCUMENTS

JP 2019-140634 A 8/2019

OTHER PUBLICATIONS

Ericsson; "New WID on NR Dynamic Spectrum Sharing (DSS)"; 3GPP TSG RAN Meeting #86, RP-193260; Sitges, Spain, Dec. 9-12, 2019 (Year: 2019).*
International Search Report issued in PCT/JP2019/051015 on Sep. 1, 2020 (2 pages).
Written Opinion of the International Searching Authority issued in PCT/JP2019/051015 on Sep. 1, 2020 (4 pages).
(Continued)

*Primary Examiner* — Margaret G Webb
(74) *Attorney, Agent, or Firm* — Osha Bergman Watanabe & Burton LLP

(57) ABSTRACT

A terminal according to an aspect of the present disclosure includes: a receiving section that receives information on one or more cells that transmit a downlink control channel for scheduling a physical shared channel of a primary cell; and a control section that determines, based on a cell that transmits the downlink control channel, at least one of a cell that monitors the downlink control channel and a search space type.

6 Claims, 14 Drawing Sheets

(56) References Cited

OTHER PUBLICATIONS

Panasonic; "Cross carrier scheduling from SCC to PCC"; 1.1 3GPP TSG-RAN WG1 Meeting #61bis, R1-103750; Dresden, Germany; Jun. 28-Jul. 2, 2010 (2 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

```
CrossCarrierSchedulingConfig ::=    SEQUENCE {
    schedulingCellInfo                  CHOICE {
        own                                 SEQUENCE {
            cif-Presence                        BOOLEAN       -- Cross carrier scheduling: scheduling cell
        },
        other                               SEQUENCE {
            schedulingCellId                    ServCellIndex,
            cif-InSchedulingCell                INTEGER (1..7) -- Cross carrier scheduling: scheduled cell
        }
    },
    ...
}
```

FIG. 2

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In an existing LTE system (for example, 3GPP Rel. 8-14), a user terminal (UE (User Equipment)) controls reception of a downlink shared channel (for example, PDSCH (Physical Downlink Shared Channel)) based on downlink control information (DCI; also referred to as DL assignment or the like) from a base station. In addition, the user terminal controls transmission of an uplink shared channel (for example, PUSCH (Physical Uplink Shared Channel)) based on DCI (also referred to as a UL grant or the like).

In an existing LTE system, cross-carrier scheduling that uses a downlink control channel of a primary cell (or secondary cell) to schedule another secondary cell is supported for a UE to which a plurality of cells (or CCs) are configured.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In an existing system, when cross-carrier scheduling is applied, a primary cell functions only as a cell for scheduling a secondary cell. A cell for scheduling another cell may be referred to as a scheduling cell, and a cell that is scheduled by another cell may be referred to as a scheduled cell or a non-scheduling cell.

It has been discussed that a configuration in which a primary cell is a scheduled cell is supported or allowed in a radio communication system (for example, Rel. 17 or later) in the future. For example, it is expected that a physical shared channel of a primary cell is scheduled by a secondary cell, in other words, a downlink control channel (or downlink control information) for scheduling the physical shared channel of the primary cell is transmitted by the secondary cell.

However, sufficient discussion has not been made on how to control cross-carrier scheduling (also referred to as cross-cell scheduling) when a primary cell is a scheduled cell.

Thus, it is one objective of the present disclosure to provide a terminal and a radio communication method that are capable of appropriately controlling communication even when a primary cell is scheduled by another cell.

Solution to Problem

A terminal according to an aspect of the present disclosure includes: a receiving section that receives information on one or more cells that transmit a downlink control channel for scheduling a physical shared channel of a primary cell; and a control section that determines, based on a cell that transmits the downlink control channel, at least one of a cell that monitors the downlink control channel and a search space type.

Advantageous Effects of Invention

According to an aspect of the present disclosure, it is possible to appropriately control communication even when a primary cell is scheduled by another cell.

BRIEF DESCRIPTION OF DRAWINGS

FIG. 2 is a diagram to show an example of cross-carrier scheduling configuration information in the existing system;

DESCRIPTION OF EMBODIMENTS

<Cross-Carrier Scheduling>

In an existing LTE system, cross-carrier scheduling (CCS) that uses a downlink control channel (for example, PDCCH) of a primary cell to schedule a physical shared channel of a secondary cell is supported for a UE to which a plurality of cells (or CCs) are configured. The physical shared channel may be, for example, at least one of a downlink shared channel (for example, PDSCH) and an uplink shared channel (for example, PUSCH). The secondary cell may schedule another secondary cell.

When configuring cross-carrier scheduling to the UE, a network (for example, a base station) may specify a cell scheduled by downlink control information (for example, DCI) by using a 3-bit CIF (Carrier Indicator Field) included in the DCI. The UE controls, based on a CIF included in received DCI (or PDCCH), transmission or reception of a physical shared channel scheduled by the DCI (or determines a cell, a physical shared channel of which is scheduled by the DCI).

Figure 1:
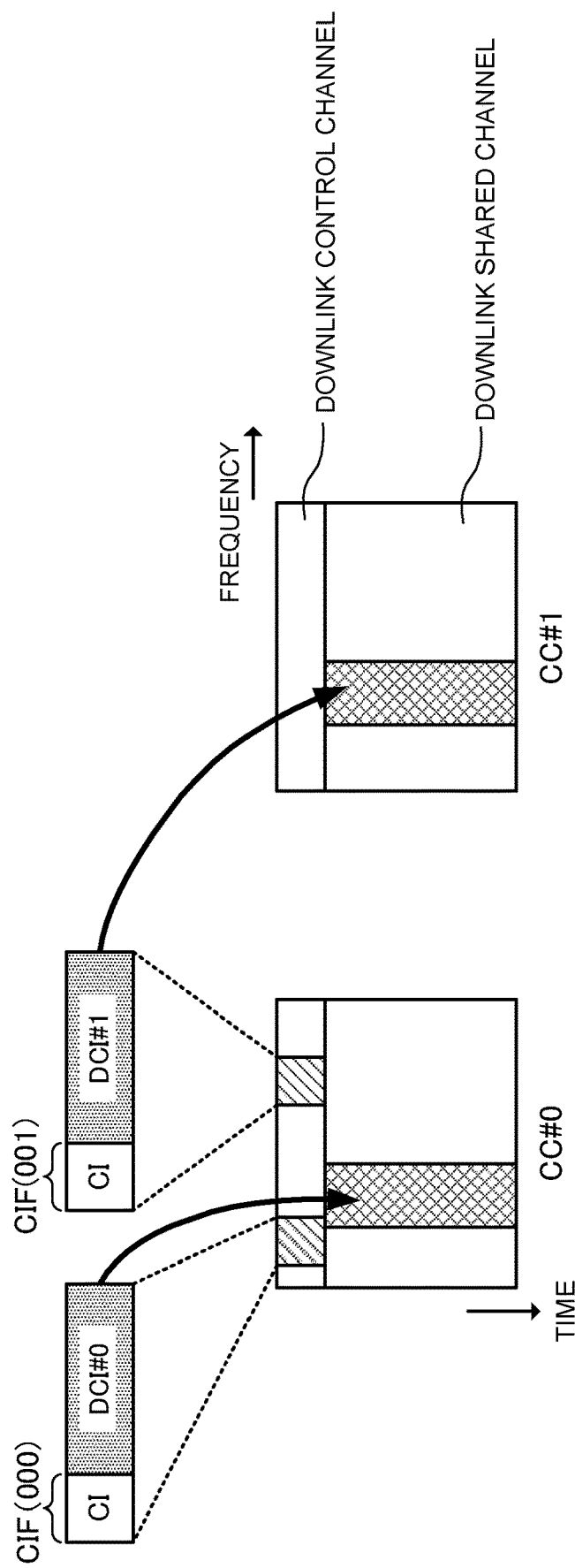
FIG. 1 is a diagram to show an example of cross-carrier scheduling in an existing system.

FIG. 1 is a diagram to show an example in which cross-carrier scheduling is applied. In FIG. 1, downlink control information (DCI #1) that indicates allocation of at least one of a PDSCH and a PUSCH (hereinafter also referred to as PDSCH/PUSCH) transmitted by a CC #1 (for example, a secondary cell) is transmitted by using a PDCCH of another CC #0 (for example, primary cell). In this case, a DCI configuration to which a carrier indicator (CI) is added is employed to identify allocation of a PDSCH/PUSCH of which CC (CC0 or CC1) is indicated by the downlink control information (DCI #1) transmitted by a PDCCH of the CC #1.

In an existing system, when cross-carrier scheduling is applied, a 3-bit carrier indicator field (CIF) is configured to DCI, and the UE is notified of a CC (or cell) scheduled by the DCI. The UE performs PDSCH reception processing or PUSCH transmission processing at a given CC based on the CIF included in the DCI.

Consider a case in which cross-carrier scheduling is configured or applied to a cell (or CC). In this case, the UE may be notified of information that cross-carrier scheduling is configured or applied to the cell and information on which cell performs the scheduling. Such information on whether cross-carrier scheduling is applied and information on a scheduling cell (for example, a cell that transmits a CIF) may be notified, from a base station to the UE, as higher layer signaling (for example, RRC signaling) of a cell (for example, a scheduled cell) on which the scheduling is performed.

A cell that controls PDSCH/PUSCH allocation of another cell (CC) (or transmits DCI including a CIF) may be referred to as a scheduling cell or a cell that performs scheduling. A cell to which cross-carrier scheduling is configured (for example, a cell scheduled based on a CIF) may be referred to as a scheduled cell or a cell that is scheduled.

Cross-carrier scheduling shown in FIG. 1 indicates a case in which Cell #0 (CC #0) corresponds to a scheduling cell and Cell #1 (corresponding to CIF=1) corresponds to a scheduled cell.

The UE determines a scheduled cell based on an index (for example, ServeCellIndex) corresponding to a 3-bit CIF value included in a PDCCH (or DCI) transmitted by a scheduling cell. DCI including a CIF having a particular bit value (for example, CIF=0) may be transmitted when PDSCH/PUSCH allocation (self-scheduling) of a scheduling cell is performed.

The correspondence relation between the value of CIF and the value of ServeCellIndex may be configured by higher layer signaling or the like. In this case, CIF may be configured to a PDCCH (or DCI) of a scheduling cell and, information on the correspondence relation between each CIF value and the corresponding index (for example, ServeCellIndex) of a scheduled cell (CC) may be transmitted by higher layer signaling.

FIG. 2 is a diagram to show an example of cross-carrier scheduling configuration information. Note that an IE name shown in FIG. 2 is merely exemplary, and the present invention is not limited to the shown name. As shown in FIG. 2, the cross-carrier scheduling configuration information (CrossCarrierSchedulingConfig) may include any of information ("own") on scheduling of the own cell and information ("other") on scheduling (cross-carrier scheduling) by another cell.

Information (cif-Presence) indicating the presence of CIF may be included as the information ("own") on scheduling of the own cell. The CIF value of the cell (scheduling cell) may be configured to be zero when cif-Presence is true. The UE may determine self-carrier scheduling when the CIF value of DCI transmitted by a scheduling cell is zero.

An identifier (cell index, scheduling cell ID, or schedulingCellId) of a cell that signals DCI may be included as the information ("other") scheduling by another cell. For example, which cell that signals DL allocation and UL grant is indicated to the UE by schedulingCellId. In addition, the value (cif-InSchedulingCell) of the CIF value of the cell (scheduled cell), which is used by a scheduling cell may be included in "other".

When decoding a PDCCH (or DCI) of a common search space (CSS), the UE may perform the decoding on an assumption that there is no CIF. Specifically, when a CIF is configured, the UE decodes a control channel to which the CIF is configured in a UE specific search space (USS), and decodes a control channel to which no CIF is configured in the common search space.

It is expected that cross-carrier scheduling is supported in a radio communication system (for example, Rel. 16, Rel. 17, Rel. 18, or later) in the future. In the existing system, cross-carrier scheduling is not configured to a primary cell. Accordingly, the primary cell is always a scheduling cell and is scheduled by a PDCCH (or DCI) transmitted by the own cell (for example, self-carrier scheduling is applied).

Discussions have been made on scheduling of a physical shared channel of a primary cell by using a downlink control channel (or DCI) of a secondary cell to achieve dynamic spectrum sharing (DSS) in a radio communication system in the future. In other words, it has been discussed that a PDCCH of a secondary cell for scheduling a physical shared channel of the primary cell is supported.

However, when a primary cell is a scheduled cell, it is a problem how to control cross-carrier scheduling. For example, when scheduling of a physical shared channel of a primary cell is performed by using a downlink control channel (or DCI) transmitted by a secondary cell, it is a problem how to control scheduling type or the like configured to the primary cell. Alternatively, it is a problem how to control monitoring or the like of a PDCCH for scheduling a physical shared channel of a primary cell.

The inventors of the present invention focused on a case in which cross-carrier scheduling that a secondary cell schedules a primary cell is supported or allowed, and came up with the present application invention through discussions on a method of controlling the cross-carrier scheduling.

Embodiments according to the present invention will be described in detail with reference to the drawings as follows. The radio communication method according to each embodiment may be employed independently or may be employed in combination.

In the present embodiment, a primary cell may be interpreted as at least one of a PCell and a PSCell (primary secondary cell). A physical shared channel may be interpreted as at least one of a PDSCH and a PUSCH. Cross-carrier scheduling may be interpreted as cross-cell scheduling. Self-carrier scheduling may be interpreted as self-scheduling.

In the present embodiment, a physical shared channel of a primary cell may be interpreted as a physical shared channel transmitted by a primary cell. The following description will be made on a case in which the UE applies cross-carrier scheduling with two cells (or two CCs) of a primary cell and a secondary cell, but the number of applicable cells is not limited to two and may be three or more.

(First Aspect)

A first aspect will be described with reference to an example in which a cell for scheduling a physical shared channel of a primary cell is controlled based on a scheduling type applied to the primary cell.

A network (for example, a base station) may configure at least one of Operations 1-1 to 1-3 below to the UE that supports cross-carrier scheduling for the primary cell. Note that a UE that supports cross-carrier scheduling for a primary cell may be interpreted as a UE that supports a PDCCH of a secondary cell for scheduling a physical shared channel of a primary cell.

<Operation 1-1>

The base station may configure, to the primary cell, a first scheduling type that scheduling is performed by another cell but not a second scheduling type that scheduling is performed by the own cell. The first scheduling type may be cross-carrier scheduling, and the second scheduling type may be self-carrier scheduling.

The base station may notify the UE of information on a scheduling type configured or applied to the primary cell. In Operation 1-1, the base station may configure only cross-carrier scheduling to the primary cell. In this case, the base station may transmit, as the information on the scheduling type, information on one or more other cells that transmit a PDCCH for scheduling a physical shared channel of the primary cell.

The information on the scheduling type may include at least one of information on the index of a scheduling cell for scheduling the primary cell and information on an index when the primary cell is specified by a given field of DCI. The information on the scheduling type may be notified or configured from the base station to the UE by using at least one of higher layer signaling and DCI.

The UE may determine, based on the information on the scheduling type, the scheduling cell (for example, secondary cell) for scheduling the primary cell. Accordingly, the UE can determine a cell that transmits a PDCCH for scheduling a physical shared channel of the primary cell, and can appropriately receive the PDCCH (refer to FIG. 3).

Figure 3:
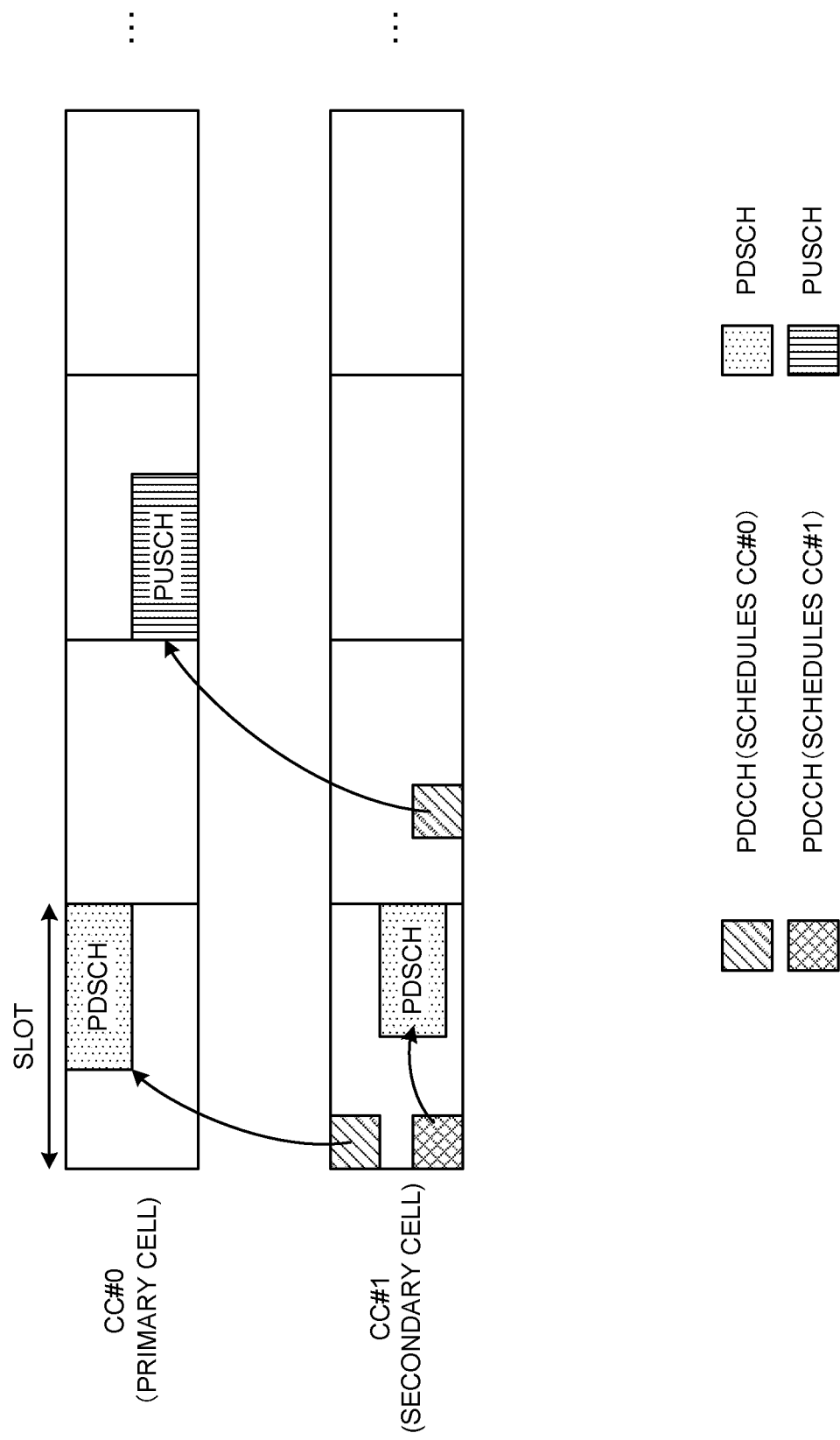
FIG. 3 is a diagram to show an example of cross-carrier scheduling according to a first aspect.

FIG. 3 is a diagram to show an example of cross-carrier scheduling when CC #1 is the scheduling cell for scheduling the primary cell (CC #0). In this example, a PDSCH and a PUSCH of CC #0 are scheduled by using a PDCCH (or DCI) transmitted by CC #1. Self-carrier scheduling may be performed on a physical shared channel of CC #1.

A cell for scheduling a PDSCH of the primary cell (or a cell that transmits a PDCCH (or DCI) for scheduling the PDCCH) and a cell for scheduling a PUSCH of the primary cell may be the same cell (refer to FIG. 3). When the same cell performs scheduling of a PDSCH and a PUSCH of the primary cell, it is possible to reduce cells, PDCCHs of which are monitored for the primary cell by the UE.

Figure 4:
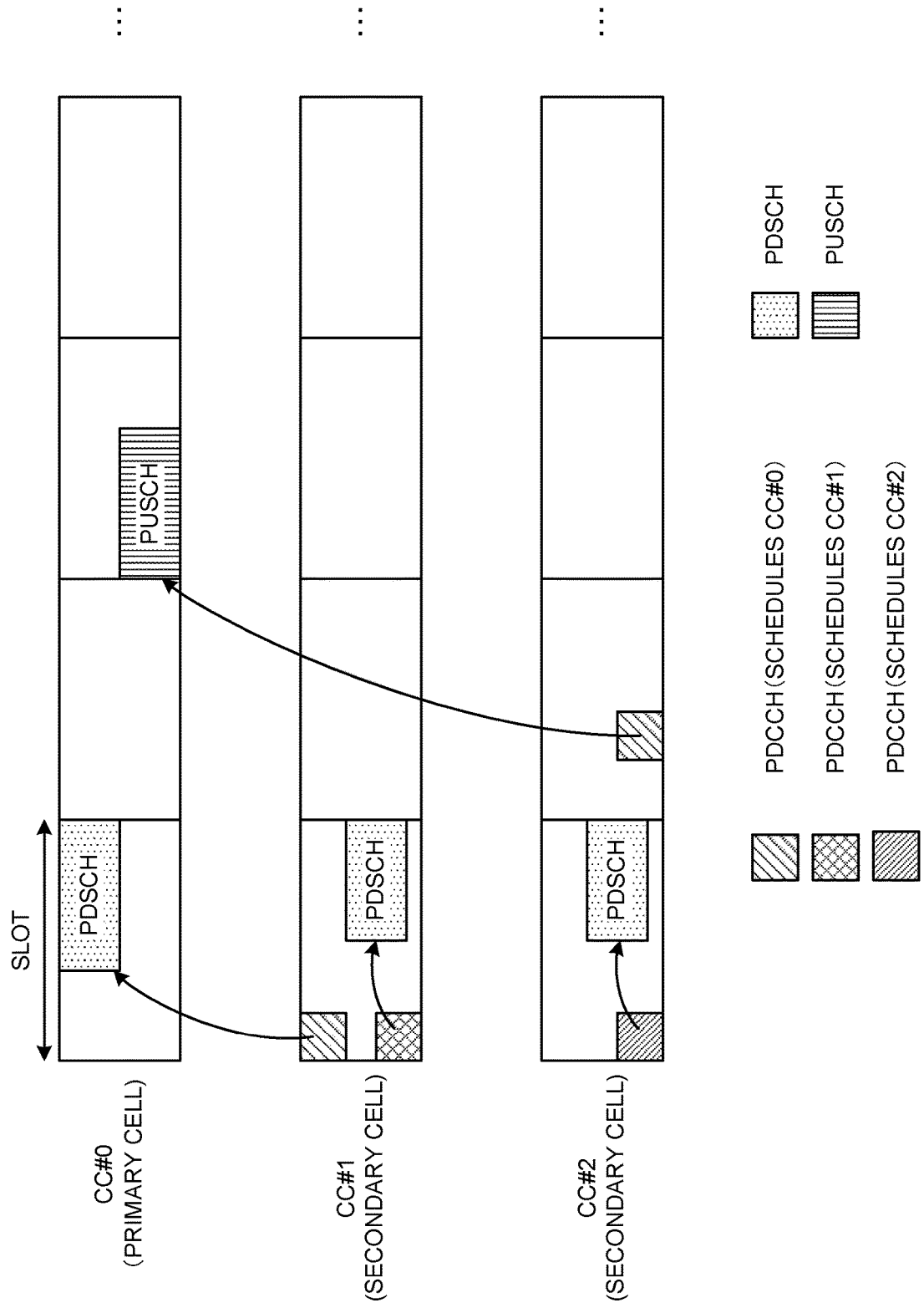
FIG. 4 is a diagram to show another example of cross-carrier scheduling according to the first aspect.

Alternatively, a cell for scheduling a PDSCH of the primary cell and a cell for scheduling a PUSCH of the primary cell may be independently configured (for example, as different cells) (refer to FIG. 4). For example, a first secondary cell (for example, CC #1) for scheduling a PDSCH of the primary cell and a second secondary cell (for example, CC #2) for scheduling a PUSCH of the primary cell may be configured as shown in FIG. 4.

In such a case, the UE may control reception processing based on an assumption that a PDCCH (for example, DCI format 1_1) for scheduling a PDSCH of the primary cell is transmitted in the first secondary cell and a PDCCH (for example, DCI format 0_1) for scheduling a PUSCH of the primary cell is transmitted in the second secondary cell.

It is possible to flexibly control cells for scheduling a PDCCH and a PUSCH of the primary cell by allowing of separate configuration of cells for scheduling a PDSCH and a PUSCH of the primary cell.

Note that when the primary cell is configured as a scheduled cell, the primary cell does not necessarily need to be configured as a scheduling cell for scheduling a physical shared channel of another secondary cell. Alternatively, when the primary cell is configured as a scheduled cell, the primary cell may be allowed to be configured as a scheduling cell for scheduling a physical shared channel of another secondary cell.

A secondary cell as a scheduling cell for scheduling the primary cell does not necessarily need to be scheduled by another cell (or does not necessarily need to be a scheduled cell). In other words, a scheduling cell for scheduling the primary cell may schedule a physical shared channel of the own cell by using a PDCCH of the own cell (apply self-carrier scheduling).

<Operation 1-2>

The base station may configure, to the primary cell, the second scheduling type (for example, self-carrier scheduling) that scheduling is performed by the own cell but not the first scheduling type (for example, cross-carrier scheduling) that scheduling is performed by another cell.

The base station may notify the UE of information on a scheduling type configured or applied to the primary cell. In Operation 1-2, the base station may configure only self-carrier scheduling to the primary cell. In this case, the base station may transmit, as the information on the scheduling type, information indicating that a physical shared channel of the primary cell is scheduled by a PDCCH of the primary cell (for example, self-carrier scheduling is performed).

Figure 5:
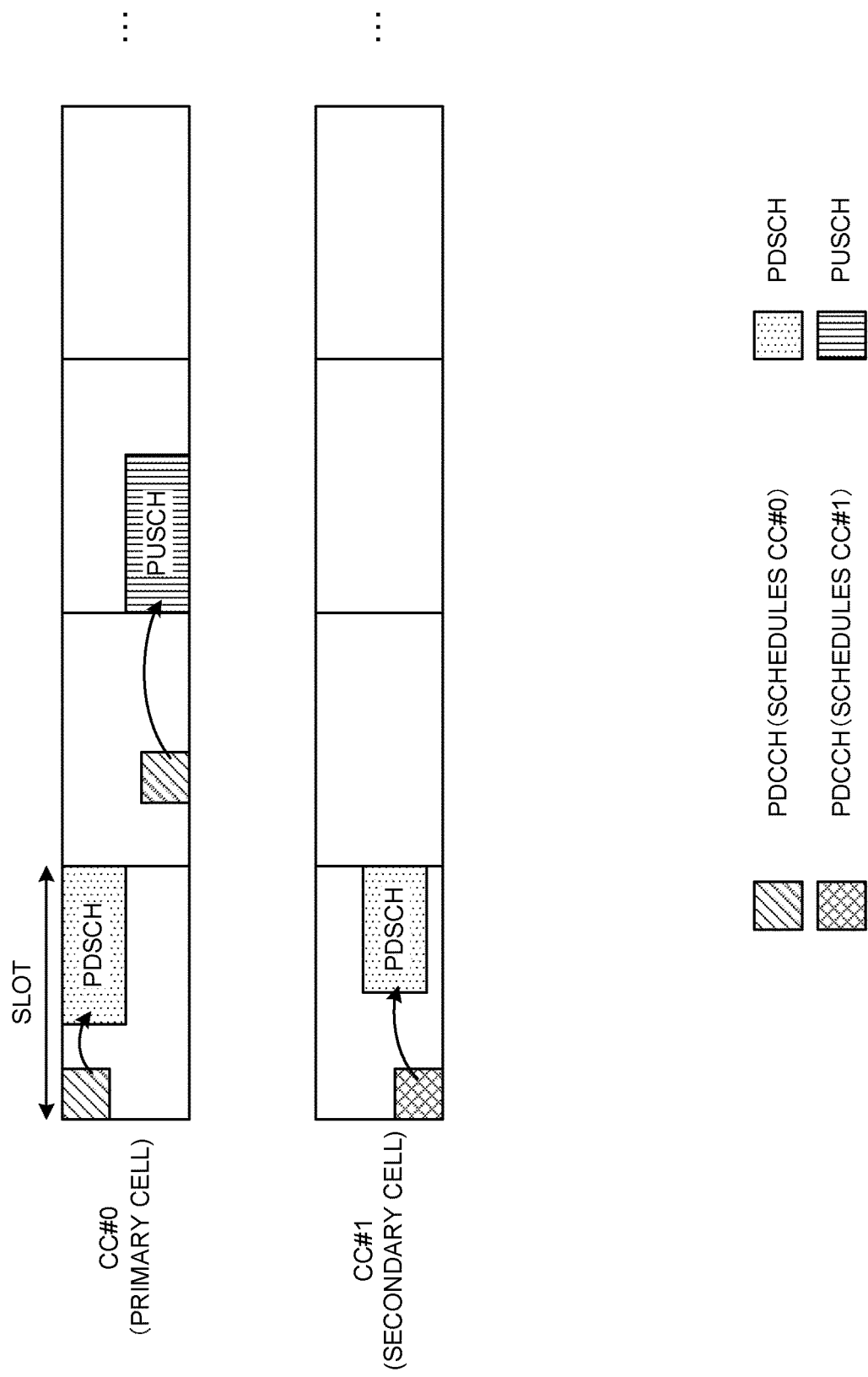
FIG. 5 is a diagram to show another example of cross-carrier scheduling according to the first aspect.

The UE may assume, based on the information on the scheduling type, that the primary cell is not scheduled by a secondary cell (or self-scheduling is performed) (refer to FIG. 5). FIG. 5 shows a case in which a physical shared channel of the primary cell (CC #0) is scheduled by a PDCCH (or DCI) transmitted by CC #0.

In this case, the UE may determine that the PDCCH (or DCI) for scheduling the primary cell is transmitted by the primary cell (CC #0) and may control reception processing of the PDCCH (or DCI).

Note that the primary cell may be configured as a scheduling cell for scheduling a physical shared channel of another secondary cell.

<Operation 1-3>

The base station may configure (enable or activate), to the primary cell, both of the first scheduling type (for example, cross-carrier scheduling) that scheduling is performed by another cell and the second scheduling type (for example, self-carrier scheduling) that scheduling is performed by the own cell.

The base station may notify the UE of information on a scheduling type configured or applied to the primary cell. The base station may transmit, as the information on the scheduling type, information on one or more other cells that transmit a PDCCH for scheduling a physical shared channel of the primary cell.

The information on the scheduling type may include at least one of information on the index of a scheduling cell for scheduling the primary cell and information on an index when the primary cell is specified by a given field of DCI. The information on the scheduling type may be notified or configured from the base station to the UE by using higher layer signaling or the like.

Alternatively, in addition to self-carrier scheduling (initial configuration), cross-carrier scheduling that scheduling is performed by a secondary cell may be configured or performed to the primary cell. For example, the UE may assume that self-carrier scheduling is applied as a default (or an initial scheduling type) to the primary cell and assume that cross-carrier scheduling is applied when cross-carrier scheduling is configured.

Cross-carrier scheduling may be configured from the base station to the UE by using at least one of higher layer signaling and downlink control information. When cross-carrier scheduling is not configured, the UE may assume that self-carrier scheduling is applied and control, at the primary cell, reception of a PDCCH for scheduling the primary cell.

When cross-carrier scheduling is configured, the UE may apply at least one of cross-carrier scheduling and self-carrier scheduling. When self-carrier scheduling and cross-carrier scheduling are both configured (or when cross-carrier scheduling is additionally configured), the UE may apply at least one of Options 1 and 2 below.

Note that the options below may be applied when two scheduling types are configured (enabled or activated) in a configuration in which self-carrier scheduling and cross-carrier scheduling are separately configured.

<Option 1>

Self-carrier scheduling and cross-carrier scheduling for the primary cell may be simultaneously supported (or applied).

For example, the first scheduling type (for example, cross-carrier scheduling) may be applied to a PDSCH of the primary cell and the second scheduling type (for example, self-carrier scheduling) may be applied to a PUSCH of the primary cell. The UE may assume that a PDCCH (or DCI) for scheduling a PDSCH of the primary cell is transmitted by another cell and a PDCCH (or DCI) for scheduling a PUSCH of the primary cell is transmitted by the primary cell (refer to FIG. 6).

Figure 6:
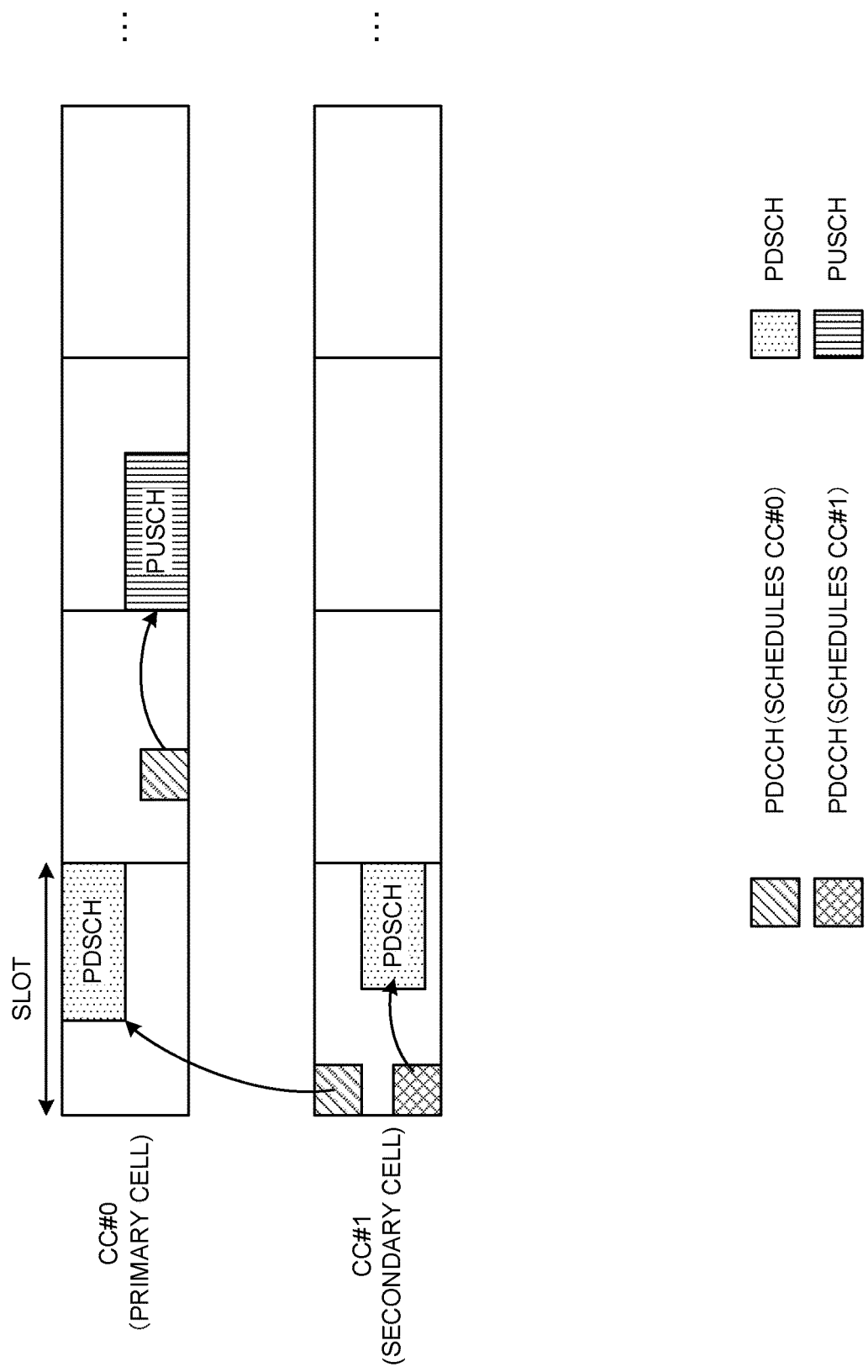
FIG. 6 is a diagram to show another example of cross-carrier scheduling according to the first aspect.

FIG. 6 shows a case in which a PDSCH of the primary cell (CC #0) is scheduled by a PDCCH of a secondary cell (CC #1) and a PUSCH of CC #0 is scheduled by a PDCCH of CC #0.

Alternatively, self-scheduling may be applied to a PDSCH of the primary cell and cross-carrier scheduling may be applied to a PUSCH of the primary cell. The UE may assume that a PDCCH (or DCI) for scheduling a PDSCH of the primary cell is transmitted by the primary cell and a PDCCH for scheduling a PUSCH of the primary cell is transmitted by another cell.

In this manner, it is possible to flexibly control a cell for scheduling the primary cell by allowing application of both self-carrier scheduling and cross-carrier scheduling based on the type of a physical shared channel.

Alternatively, self-carrier scheduling and cross-carrier scheduling may be both supported for a PDSCH and a PUSCH for one or a plurality of transmission/reception points. For example, self-carrier scheduling and cross-carrier scheduling may be applied for a PDSCH transmitted from a transmission/reception point.

In this manner, it is possible to flexibly control scheduling of a physical shared channel by allowing simultaneous application of both self-carrier scheduling and cross-carrier scheduling.

<Option 2>

A configuration (for example, dynamic switching) in which self-carrier scheduling and cross-carrier scheduling are dynamically switched for the primary cell may be supported or applied.

Switching between self-carrier scheduling and cross-carrier scheduling may be controlled based on scheduling related to the configuration (for example, "configuration") of a secondary cell. For example, the UE may determine the switching based on at least one of the configurations (for example, CORESET configurations) of a DCI format, a search space, and a control resource set.

Figure 7:
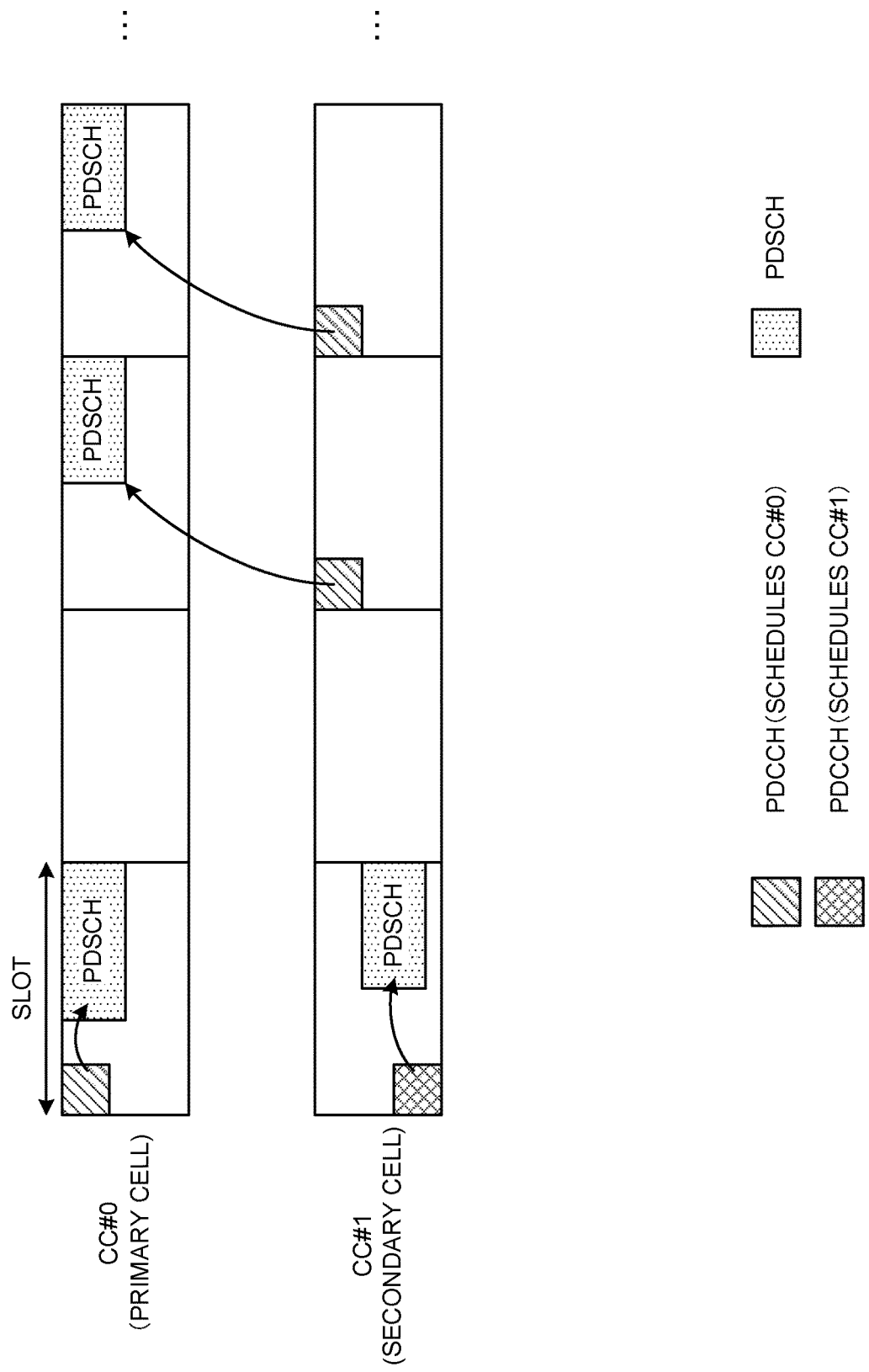
FIG. 7 is a diagram to show another example of cross-carrier scheduling according to the first aspect.

For example, the UE may determine that a scheduling type applied to the primary cell is switched or changed when a given DCI is received at least at a secondary cell (CC #1) (refer to FIG. 7). FIG. 7 shows a case in which the scheduling type applied to the primary cell is switched from self-carrier scheduling to cross-carrier scheduling.

Although switching from self-carrier scheduling to cross-carrier scheduling is performed in this example, switching from cross-carrier scheduling to self-carrier scheduling may be performed. A timer may be employed in operation of switching scheduling types. For example, the timer may be activated when switching is performed from the first scheduling type to the second scheduling type, and the first scheduling type may be applied again in accordance with expire of the timer.

For example, self-carrier scheduling may be applied when the DCI format of a secondary cell (CC #1) is a given DCI format and a search space is the common search space (CSS), or cross-carrier scheduling may be applied otherwise. The given DCI format may be a fallback DCI format (for example, a DCI format 0_0 or 1_0). Accordingly, scheduling of a physical shared channel of the primary cell can be continued even when the secondary cell (CC #1) is deactivated.

Alternatively, switching may be performed from self-carrier scheduling, which is a default scheduling type of the primary cell (CC #0), to cross-carrier scheduling based on the DCI of at least one of the primary cell (CC #0) and secondary cell (CC #1).

Alternatively, switching between self-carrier scheduling and cross-carrier scheduling may be controlled based on a bandwidth part (BWP) configured to the secondary cell or the primary cell. For example, the switching may be controlled based on a BWP (active BWP) activated at the secondary cell.

Figure 8:
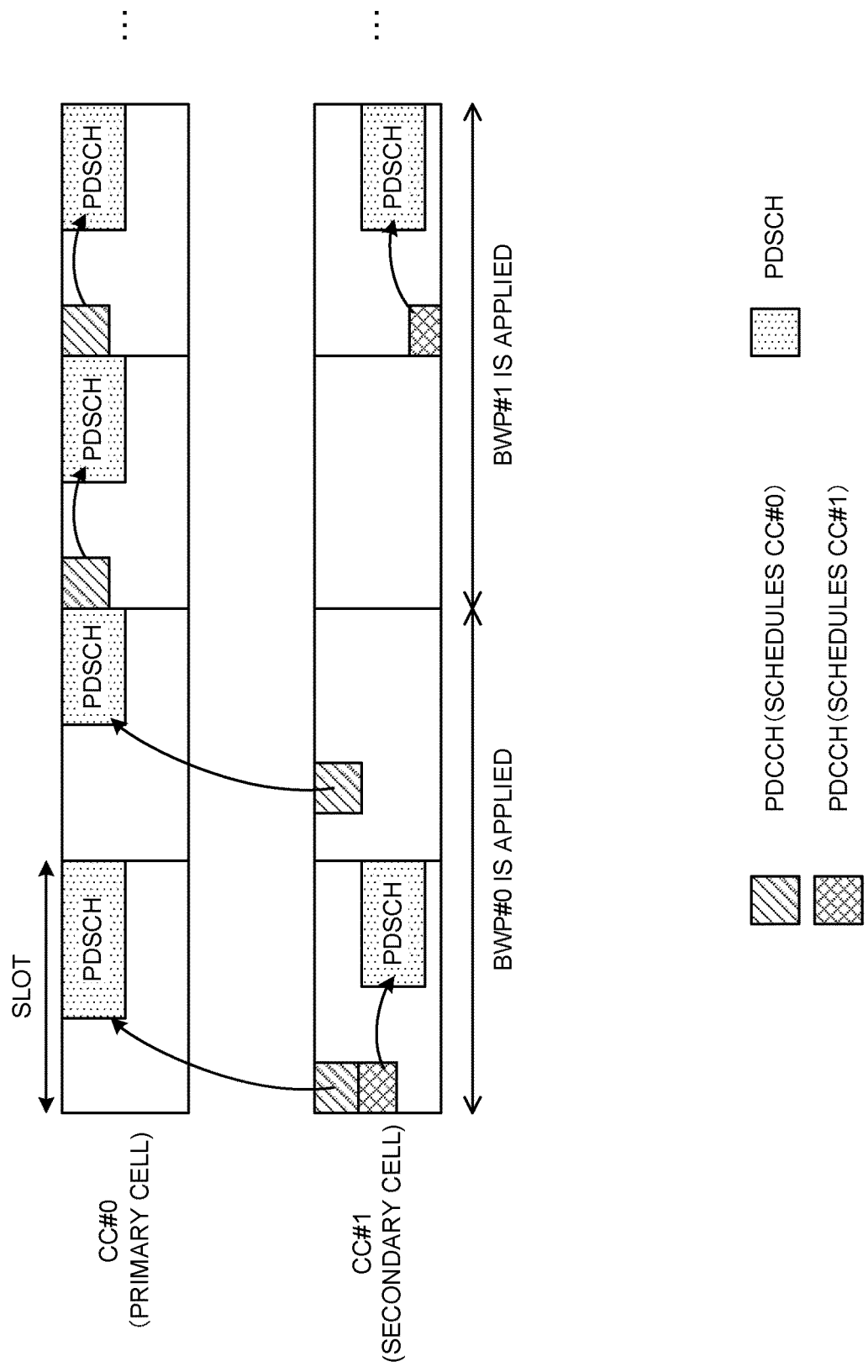
FIG. 8 is a diagram to show another example of cross-carrier scheduling according to the first aspect.

Consider a case in which two BWPs (for example, BWP #0 and BWP #1) are provided or configured to the secondary cell (CC #1). The UE may determine that cross-carrier scheduling is applied to the primary cell when BWP #0 is activated (or a PDCCH is transmitted by BWP #0). In this case, the UE may control reception based on an assumption that a PDCCH for scheduling CC #0 is transmitted in CC #1 (refer to FIG. 8).

The UE may determine that self-carrier scheduling is applied to the primary cell when BWP #1 is activated (or a PDCCH is transmitted by BWP #1). In this case, the UE may control reception based on an assumption that a PDCCH for scheduling CC #0 is transmitted in CC #0.

Alternatively, when self-carrier scheduling and cross-carrier scheduling are configured or supported for the primary cell, self-carrier scheduling may be applied only in a particular situation (condition) or case. For example, the UE may apply cross-carrier scheduling in a first case below and apply self-carrier scheduling in a second case below. The second case may be at least one of Cases 1 to 4 below.

[Case 1]

Self-carrier scheduling may be applied to the primary cell when the secondary cell as a scheduling cell is in a dormancy status or a deactivated status. The UE may assume that self-carrier scheduling is applied to the primary cell when communication is impossible in the scheduling cell (for example, transmission of a PDCCH is restricted) in a fallback status (fallback conditions).

Accordingly, scheduling of a physical shared channel of the primary cell can be continued even when the secondary cell (CC #1) is deactivated.

[Case 2]

In a contention-based random access procedure (contention-based RACH procedure), self-carrier scheduling may be applied for at least one of Messages 2 and 4 transmitted by the primary cell. Message 2 may be scrambled with a RA-RNTI, and Message 4 may be scrambled with a TC-RNTI or a C-RNTI.

In the contention-based random access procedure, the UE may assume that a PDCCH for scheduling Message 2 (for example, a PDSCH) transmitted by the primary cell and a PDCCH for scheduling Message 4 (for example, a PDSCH) transmitted by the primary cell are transmitted by the primary cell.

[Case 3]

In a contention-free random access procedure (contention-free RACH procedure), self-carrier scheduling may be applied for at least one of a PDCCH order transmitted by the primary cell, Message 2, and Message 4. Message 2 may be scrambled with a RA-RNTI, and Message 4 may be scrambled with a C-RNTI.

In the contention-free random access procedure, the UE may assume that a PDCCH order transmitted by the primary cell, a PDCCH for scheduling Message 2 (for example, a PDSCH), and a PDCCH for scheduling Message 4 (for example, a PDSCH) transmitted by the primary cell are transmitted by the primary cell.

[Case 4]

Self-carrier scheduling may be applied for a given DCI format transmitted in the common search space at the primary cell. The given DCI format may be, for example, the DCI format 0_0 or 1_0. The given DCI format may be scrambled with at least one of a C-RNTI, a CS-RNTI, and an MCS-C-RNTI.

The UE may control reception of a PDCCH (or DCI) transmitted in the common search space based on an assumption that the PDCCH is transmitted by the primary cell.

Note that whether to configure cross-carrier scheduling (or a PDCCH of the secondary cell for scheduling a physical shared channel of the primary cell) for the primary cell may be controlled for each frequency range. For example, cross-carrier scheduling for the primary cell may be separately configured to a first frequency range (for example, FR1) and a second frequency range (for example, FR2). Note that the frequency ranges may be configured in the units of bands, the units of CCs, or the units of BWPs. Each frequency range may be interpreted as a frequency domain.

In this case, the base station may notify the UE of whether cross-carrier scheduling is configured to the primary cell for each frequency band, by using higher layer signaling or the like. The UE may determine whether cross-carrier scheduling is applied for each frequency band based on information (for example, information on the scheduling type) notified by the base station.

Alternatively, cross-carrier scheduling for the primary cell may be supported only in a given frequency range. For example, configuration of cross-carrier scheduling to the primary cell may be supported for the first frequency range (for example, FR1) and no configuration of cross-carrier scheduling to the primary cell may be supported for the second frequency range (for example, FR2).

When the primary cell is configured to a frequency domain for which configuration of cross-carrier scheduling to the primary cell is not supported, the UE may determine that self-carrier scheduling is applied to the primary cell (a PDCCH for scheduling a physical shared channel of the primary cell is transmitted by the primary cell).

(Second Aspect)

A second aspect will be described with reference to an example of UE operation (for example, PDCCH monitoring) when cross-carrier scheduling is configured to the primary cell. Note that at least one of Operations 1-1 and 1-3 in the first aspect may be assumed when cross-carrier scheduling is configured to the primary cell. In the following description, a PDCCH may be interpreted as a PDCCH candidate.

The UE may receive information on one or more cells that transmit a PDCCH for scheduling a physical shared channel of the primary cell and may determine whether cross-carrier scheduling is configured or applied to the primary cell. The UE may determine, based on a cell for transmitting the PDCCH (or the type of the cell), at least one of a cell for monitoring the PDCCH and a search space type for monitoring the PDCCH.

When cross-carrier scheduling is configured to the primary cell (or when a PDCCH for scheduling the primary cell is transmitted at least by the secondary cell), the UE may perform at least one of Operations 2-1 to 2-2 below.

<Operation 2-1>

Figure 9:
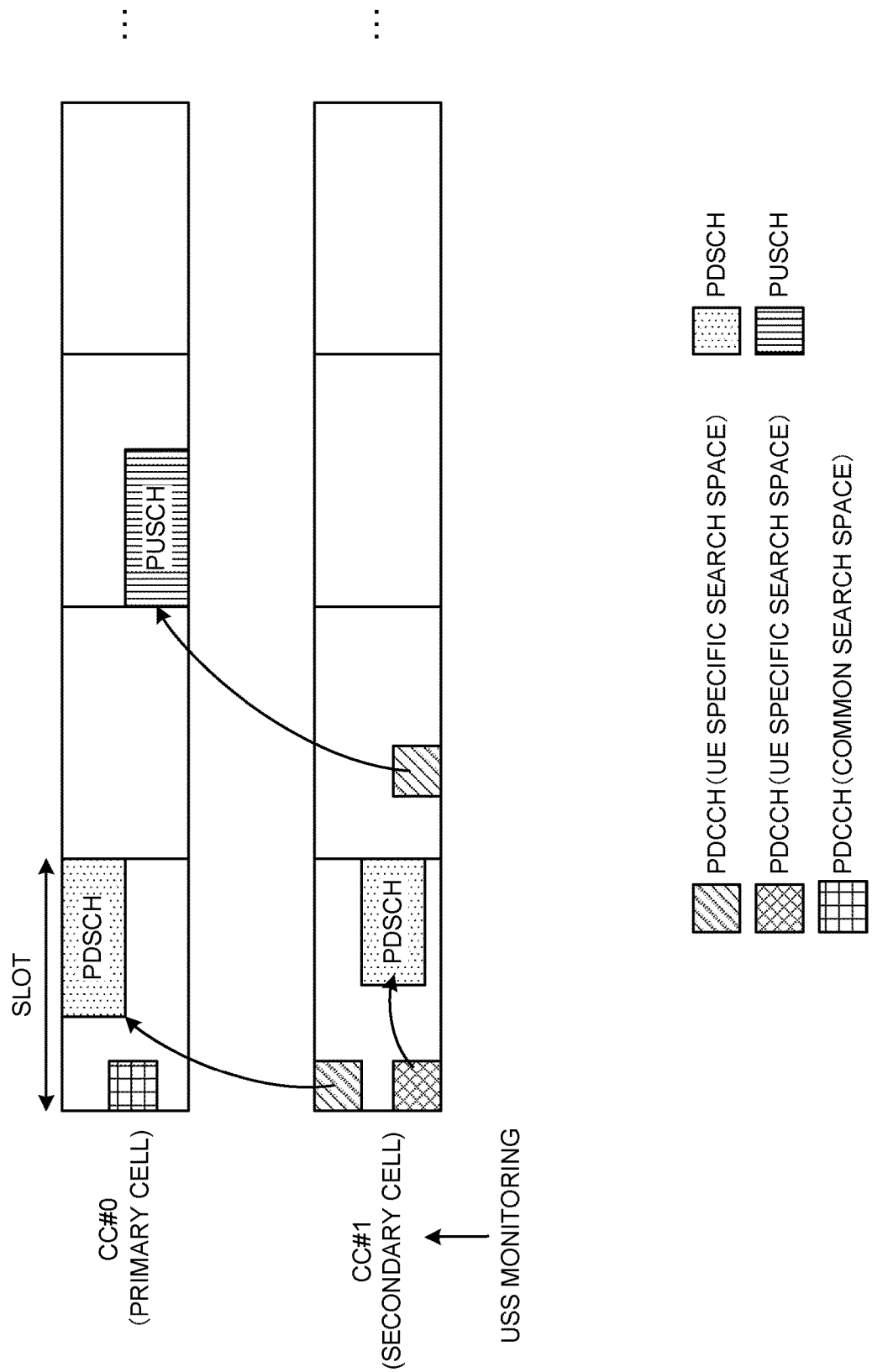
FIG. 9 is a diagram to show an example of cross-carrier scheduling according to a second aspect.

No PDCCH monitoring in the UE specific search space (for example, USS) of the primary cell (CC #0) may be requested for the UE (refer to FIG. 9). In this case, the UE performs PDCCH monitoring in a UE specific search space set to the scheduling cell (CC #1) for scheduling the primary cell (CC #0). The UE may perform control not to monitor a PDCCH in the UE specific search space of CC #0. Accordingly, it is possible to selectively monitor a PDCCH in a scheduling cell for transmitting the PDCCH.

Note that the UE may perform control to monitor a PDCCH in a common search space set to CC #0 even when cross-carrier scheduling is applied to the primary cell (CC #0). Accordingly, it is possible to appropriately detect a PDCCH used for processing other than scheduling of a physical shared channel of the primary cell.

<Operation 2-2>

Figure 10:
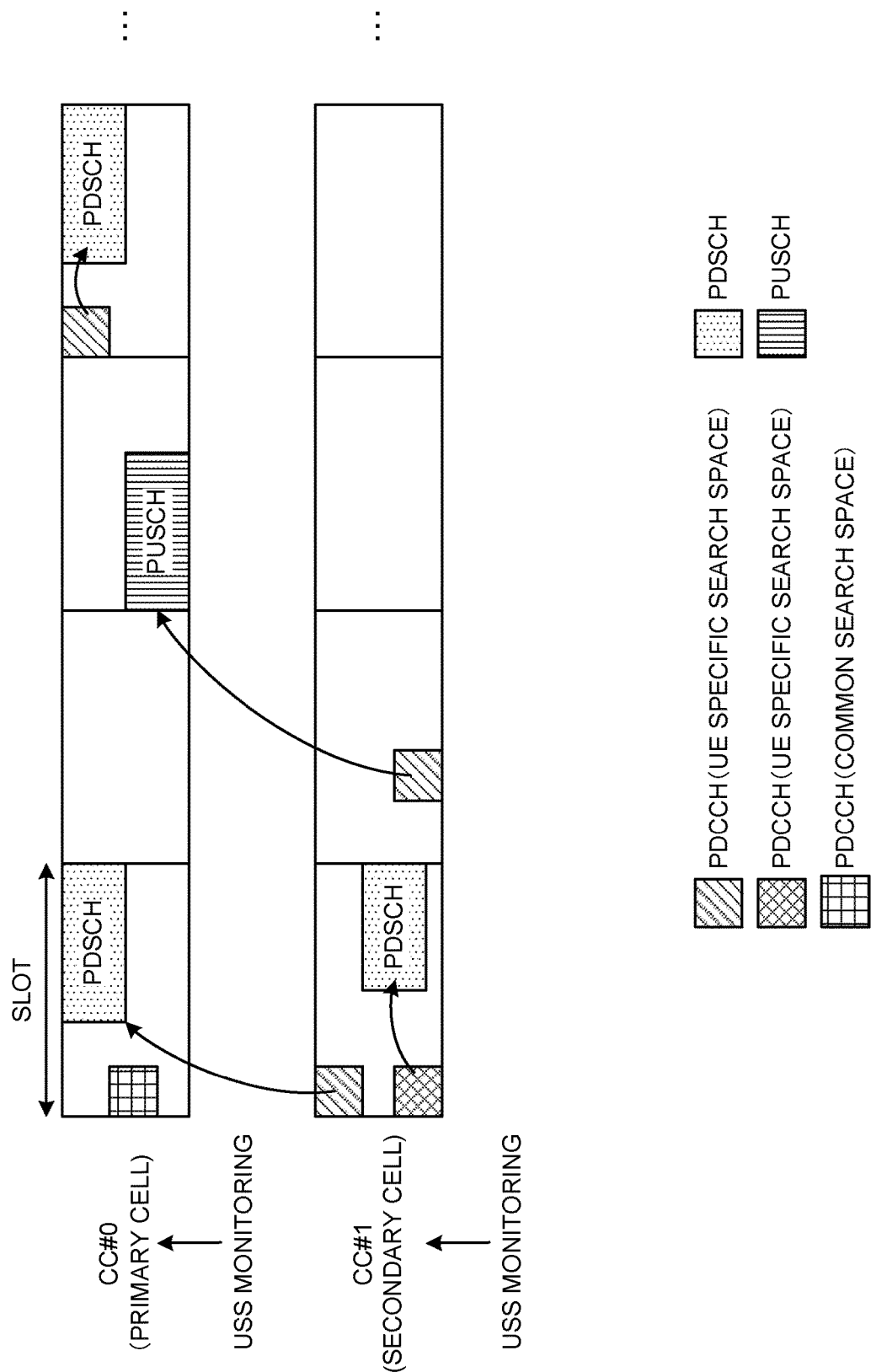
FIG. 10 is a diagram to show another example of cross-carrier scheduling according to the second aspect.

The UE may monitor a PDCCH in a UE specific search space set to each of the primary cell (CC #0) and the scheduling cell (CC #1) for scheduling the primary cell (CC #0) (refer to FIG. 10). For example, when cross-carrier scheduling and self-carrier scheduling are both configured to the primary cell, the UE may monitor a PDCCH in the primary cell (CC #0) and the secondary cell (CC #1) as a scheduling cell.

When the primary cell and the scheduling cell are both monitored, a PDCCH for scheduling a physical shared channel of the primary cell may be transmitted in the UE specific search space of each of the primary cell and the scheduling cell. In this case, a plurality of PDCCHs transmitted in the UE specific search space of at least one of the primary cell and the scheduling cell may be controlled not to be transmitted in a given range or a given region.

For example, a plurality of PDCCHs may be controlled not to be transmitted in the same PDCCH monitoring occasion. Alternatively, a plurality of PDCCHs may be controlled to be transmitted without overlapping in the time domain. Alternatively, a plurality of PDCCHs may be controlled not to be transmitted in the same slot.

The UE may control reception of a PDCCH based on an assumption that a plurality of PDCCHs are not detected in a given range or a given region.

In some cases, the UE detects a plurality of PDCCHs transmitted in the UE specific search space of at least one of the primary cell and the scheduling cell, and a plurality of physical shared channels scheduled by the respective PDCCHs are scheduled in a given range or a given region. For example, the plurality of physical shared channels overlap one another in the time domain in some cases. Alternatively, the plurality of physical shared channels are scheduled in the same slot in some cases.

In such a case, the UE may perform transmission or reception of a plurality of physical shared channels in a case in which the UE has capability of receiving a plurality of physical shared channels (for example, PDSCHs) or capability of transmitting a plurality of physical shared channels (for example, PUSCHs).

In other cases (for example, when not having given UE capability), the UE may perform control to receive or transmit a particular physical shared channel (for example, one physical shared channel) among a plurality of physical shared channels based on a given condition. The given condition may be at least one of a traffic priority corresponding to the physical shared channel and a processing timeline constrict.

For example, the priority of a physical shared channel (for example, URLLC) for which low latency and high reliability are requested may be configured to be higher than the priority of another physical shared channel (for example, eMBB). A priority configured to a physical shared channel may be defined in specifications in advance or may be configured from the base station to the UE by higher layer signaling or the like. When a first physical shared channel scheduled in a given duration or longer after PDCCH reception and a second physical shared channel scheduled in a duration shorter than the given duration overlap each other, control may be performed to transmit the first physical shared channel and not to transmit (for example, to drop) the second physical shared channel.

Alternatively, the given condition may be a scheduling type. For example, one of a physical shared channel scheduled for cross-carrier scheduling and a physical shared channel scheduled for self-carrier scheduling may be controlled to be transmitted in priority.

In this manner, it is possible to appropriately monitor a PDCCH by the UE through control as described above when cross-carrier scheduling is applied to the primary cell.

(Third Aspect)

A third aspect will be described with reference to the relation between the primary cell and a secondary cell as a scheduling cell when the secondary cell performs scheduling of the primary cell (cross-carrier scheduling is configured to the primary cell).

When the secondary cell performs scheduling of a physical shared channel of the primary cell, at least one of Conditions (restrict or supports) 1 to 4 below may be configured.

<Condition 1>

The secondary cell as a scheduling cell and the primary cell as a scheduled cell may have at least one of Conditions 1-1 to 1-4 below.

[Condition 1-1]

It may be requested that the secondary cell and the primary cell belong to the same cell group (for example, at least one of a MCG, a SCG, and a PUCCH cell group). Accordingly, it is possible to prevent complication of operation of cross-carrier scheduling.

[Condition 1-2]

It may be requested that the secondary cell and the primary cell belong to the same timing advance group (TAG). Accordingly, it is possible to prevent increase of delay difference between cells (for example, the primary cell and the secondary cell) that perform cross-carrier scheduling.

[Condition 1-3]

It may be requested that at least one of the same numerology (for example, subcarrier spacing) and the same cyclic prefix (CP) is applied to the secondary cell and the primary cell.

Accordingly, it is possible to prevent complication of operation of cross-carrier scheduling.

[Condition 1-4]

It may be requested that the secondary cell and the primary cell use the same frequency range or are configured to the same frequency range. Accordingly, it is possible to prevent complication of operation of cross-carrier scheduling.

<Condition 2>

Cross-carrier scheduling by the secondary cell may be performed for a physical shared channel to which a given RNTI is applied among physical shared channels (at least one of a PDSCH and a PUSCH) transmitted by the primary cell. The physical shared channel to which the given RNTI is applied may be a physical shared channel scheduled by a PDCCH (or DCI) CRC-scrambled with the given RNTI or may be a physical shared channel scrambled with the given RNTI.

The given RNTI may be at least one of a C-RNTI, an MCS-C-RNTI, a CS-RNTI, and an SP-CSI-RNTI.

<Condition 3>

It may be supported to indicate (cross-carrier activation/deactivation (release)), by the secondary cell as a scheduling cell, at least one of activation and deactivation (or release) of semi-persistent schedule (SPS) at the primary cell. For example, the UE may control activation/deactivation of semi-persistent scheduling based on DCI transmitted from the secondary cell as a scheduling cell.

Alternatively, it may be supported to indicate (cross carrier activation/deactivation (release)), by the secondary cell as a scheduling cell, activation and deactivation (or release) of configured-grant-based PUSCH transmission (for example, Type 2) at the primary cell. For example, the UE may control activation/deactivation of configured-grantbased PUSCH transmission based on DCI transmitted from the secondary cell as a scheduling cell.

<Condition 4>

It may be supported to indicate (cross carrier activation/deactivation (release)), by the secondary cell as a scheduling cell, at least one of activation and deactivation (or release) of a report (for example, a semi-persistent CSI report (SPS-CSI report)) of channel state information at the primary cell. For example, the UE may control activation/deactivation of a CSI report based on DCI transmitted from the secondary cell as a scheduling cell.

In this manner, when the secondary cell schedules a physical shared channel of the primary cell, activation/deactivation of given operation may be indicated by using a PDCCH (or DCI) transmitted by the secondary cell. Accordingly, it is possible to indicate activation/deactivation of given operation by using a PDCCH for performing cross-carrier scheduling.

(Fourth Aspect)

A fourth aspect will be described with reference to UE capability (for example, "UE capability") for configuration of cross-carrier scheduling to the primary cell. Note that the UE capability may be interpreted as UE capability for a PDCCH of a secondary cell for scheduling a physical shared channel of the primary cell.

Given UE capability for a PDCCH of a secondary cell for scheduling a physical shared channel of the primary cell may be defined for the primary cell and a cell group including one or more secondary cells. When the primary cell and a given cell group including one or more secondary cells are configured, the UE may report whether to support the given UE capability to the network (for example, the base station).

The given UE capability may be defined for each of different physical shared channels of the primary cell. For example, UE capability (for example, PDSCH UE capability) related to whether to support a PDCCH of a secondary cell for scheduling a PDSCH of the primary cell, and UE capability (for example, PUSCH UE capability) related to whether to support a PDCCH of a secondary cell for scheduling a PUSCH of the primary cell may be separately defined.

The UE may separately report PDSCH UE capability information and PUSCH UE capability information to the base station. In this case, only information on supported UE capability may be reported.

The given UE capability may be configured for each frequency range (also referred to as frequency domain). The UE may report UE capability information for the first frequency range (for example, FR1) and UE capability information for the second frequency range (for example, FR2).

Configuration of cross-carrier scheduling to the primary cell (or a PDCCH of a secondary cell for scheduling a physical shared channel of the primary cell) may be supported only for a particular frequency range. When the primary cell is configured to the particular frequency range, the UE may perform control to report given UE capability information.

When the primary cell is configured to a frequency range other than the particular frequency range, the UE does not necessarily need to report the given UE capability information. When the primary cell is configured to a frequency range other than the particular frequency range, the UE may determine that self-carrier scheduling is applied to the primary cell (a PDCCH for scheduling a physical shared channel of the primary cell is transmitted by the primary cell).

(Radio Communication System)

Hereinafter, a structure of a radio communication system according to one embodiment of the present disclosure will be described. In this radio communication system, a radio communication method according to each embodiment of the present disclosure described above may be used alone or may be used in combination for communication.

Figure 11:
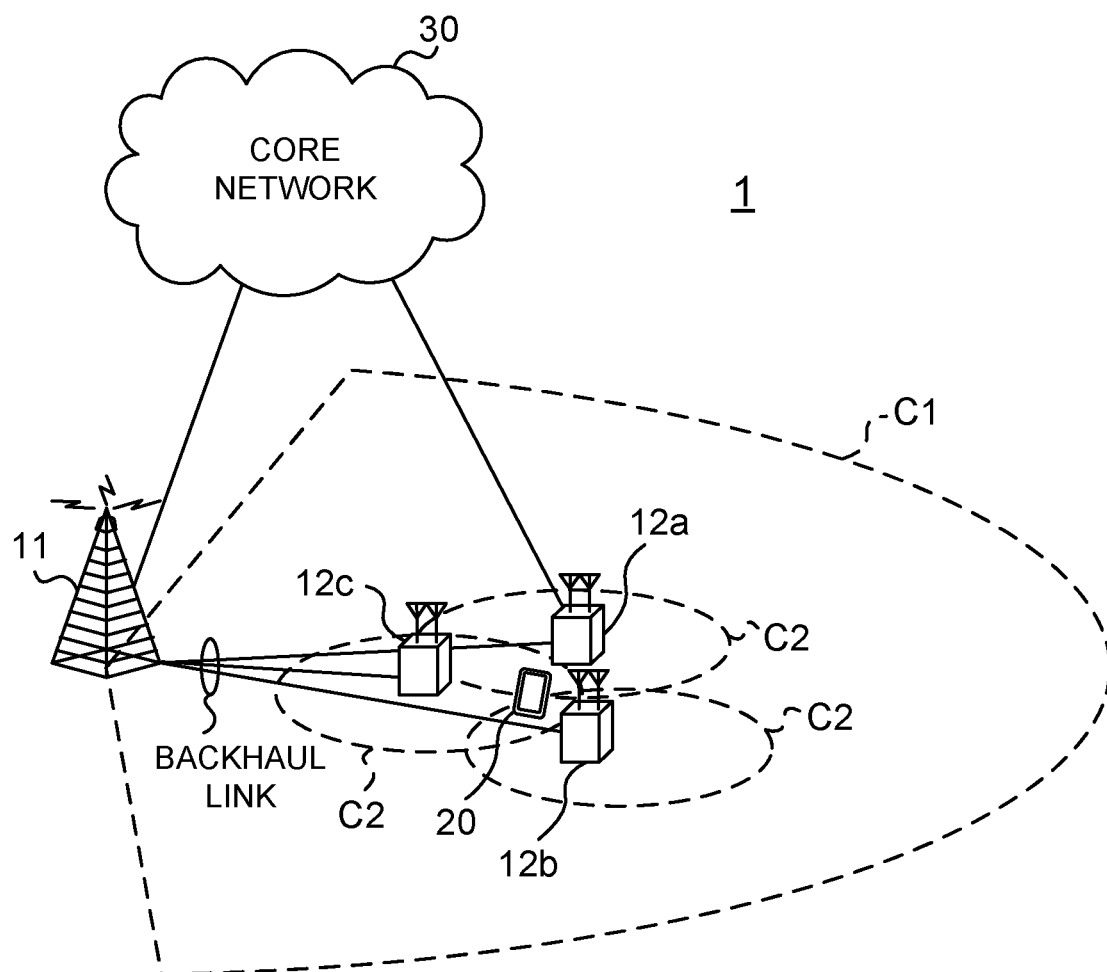
FIG. 11 is a diagram to show an example of a schematic structure of a radio communication system according to one embodiment.

FIG. 11 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 12:
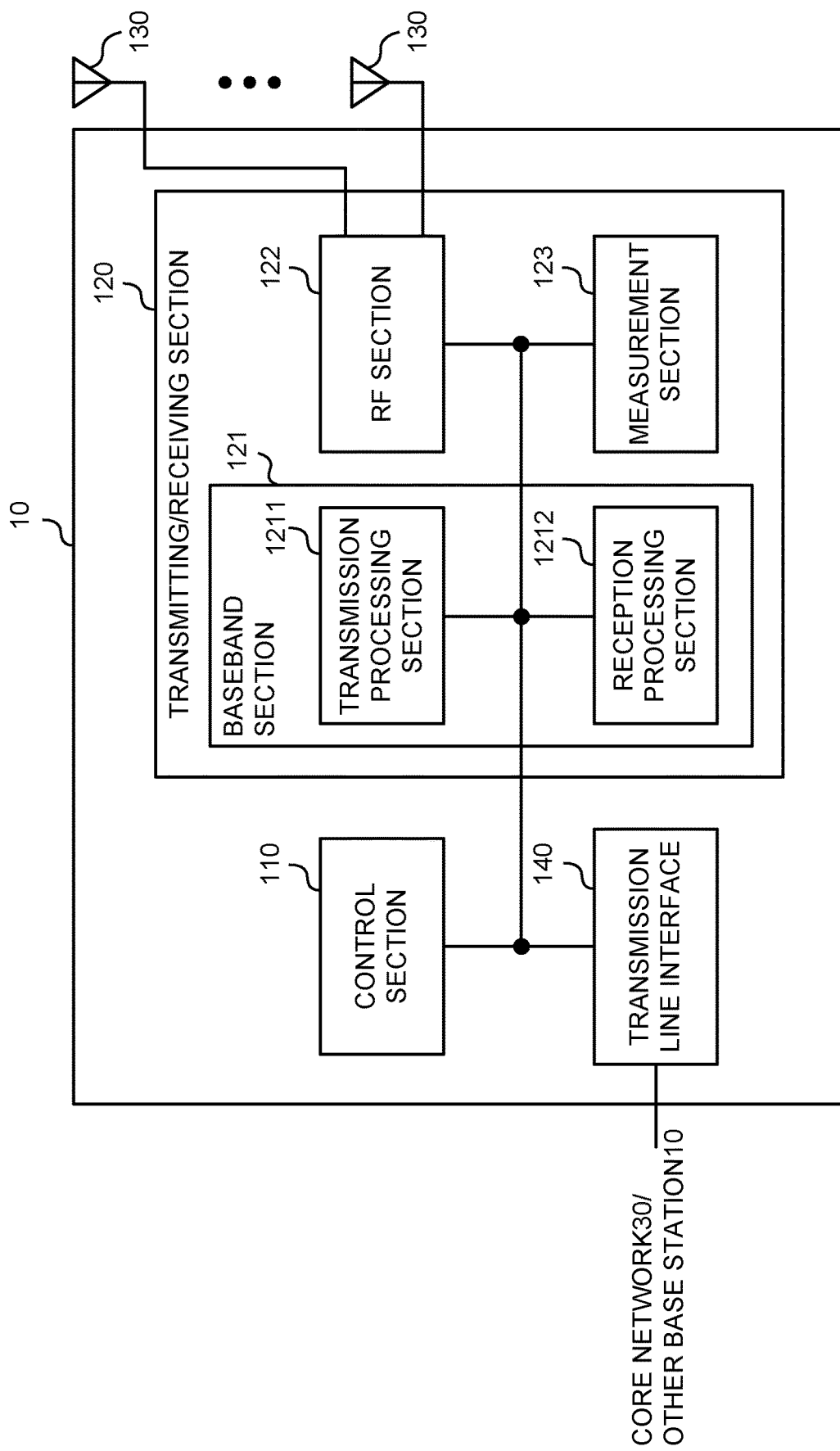
FIG. 12 is a diagram to show an example of a structure of a base station according to one embodiment.

FIG. 12 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information on a scheduling type applied to the primary cell. For example, the transmitting/receiving section 120 may transmit information on one or more cells that transmit a downlink control channel for scheduling a physical shared channel of the primary cell.

The control section 110 may control, based on at least one of the information on the scheduling type and a frequency range in which a physical shared channel of the primary cell is transmitted, a cell that transmits a downlink control channel for scheduling a physical shared channel of the primary cell.

The control section 110 may control, based on the cell that transmits the downlink control channel, at least one of a cell that transmits a downlink control channel (or PDCCH candidate) and a search space type.

(User Terminal)

Figure 13:
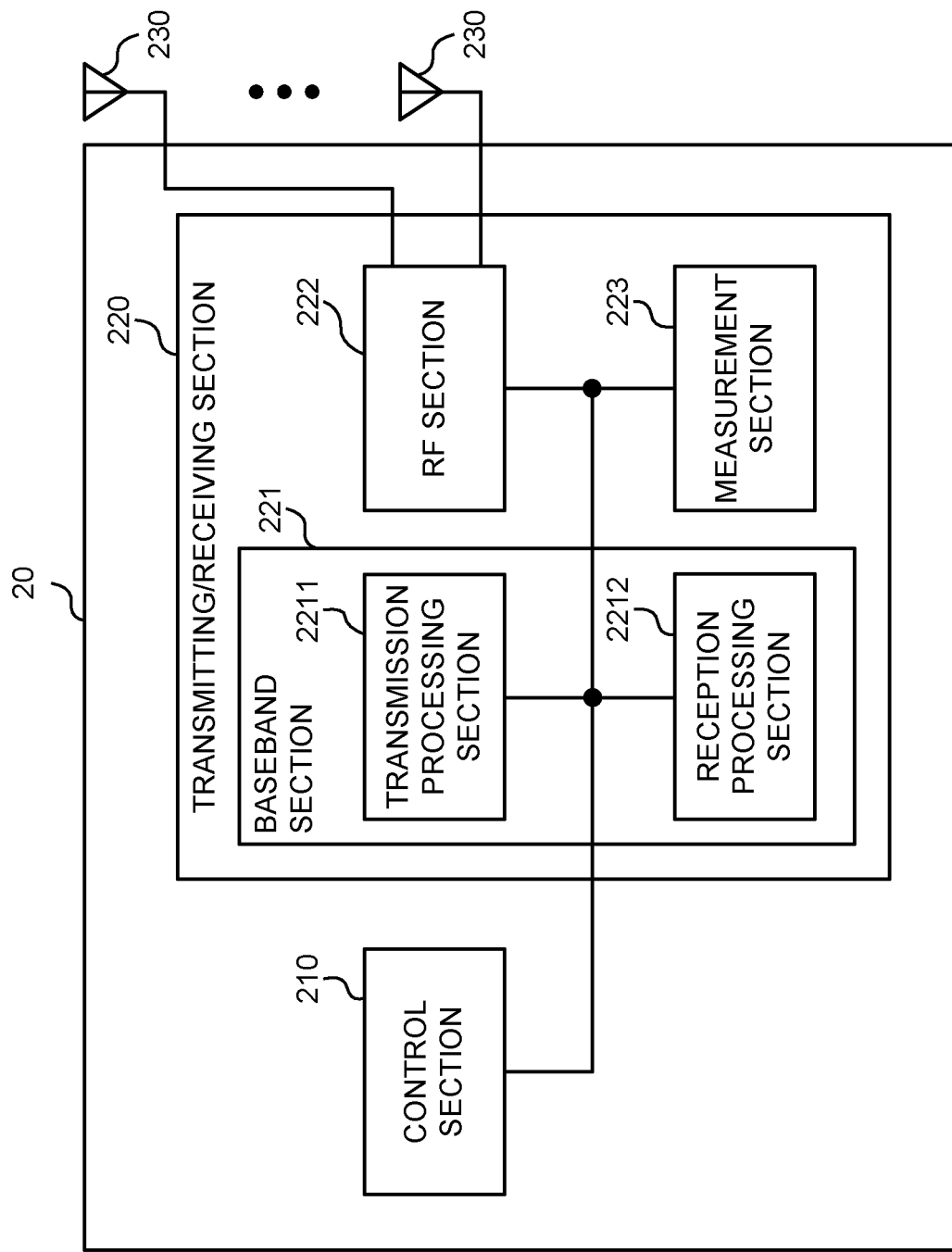
FIG. 13 is a diagram to show an example of a structure of a user terminal according to one embodiment.

FIG. 13 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 receives information on a scheduling type applied to the primary cell. For example, the transmitting/receiving section 220 may receive information on one or more cells that transmit a downlink control channel for scheduling a physical shared channel of the primary cell.

The control section 210 may determine, based on at least one of the information on the scheduling type and a frequency range in which a physical shared channel of the primary cell is transmitted, a cell that transmits a downlink control channel for scheduling a physical shared channel of the primary cell.

A cell for scheduling an uplink shared channel of the primary cell and a cell for scheduling a downlink shared channel of the primary cell may be separately configured.

When a first scheduling type that scheduling is performed by another cell and a second scheduling type that scheduling is performed by the primary cell are configured to the primary cell, the first scheduling type and the second scheduling type may be simultaneously applied.

Alternatively, when the first scheduling type that scheduling is performed by another cell and the second scheduling type that scheduling is performed by the primary cell are configured to the primary cell, the first scheduling type and the second scheduling type may be applied in a switching manner.

When the first scheduling type that scheduling is performed by another cell is configured to the primary cell, at least one of the same cell group, the same timing advance group, the same numerology, and the same frequency range may be applied to the primary cell and the other cell.

The control section 210 may determine, based on a cell that transmits a downlink control channel, at least one of a cell that monitors the downlink control channel and a search space type.

For example, when a downlink control channel is transmitted by a secondary cell, no monitoring of a downlink control channel in a UE specific search space of the primary cell may be requested for the control section 210 (or control not to monitor a downlink control channel in the UE specific search space may be performed). In this case, the control section 210 may monitor a downlink control channel in a common search space of the primary cell.

Alternatively, when a downlink control channel is transmitted at least by a secondary cell, the control section 210 may perform control to monitor a downlink control channel in the primary cell and the secondary cell. The control section 210 may determine or assume that a plurality of downlink control channels are not to be detected in at least one of the same downlink control channel monitoring occasion, the same slot, and an overlapping time domain. Alternatively, the control section 210 may detect a plurality of downlink control channels for scheduling physical shared channels of the primary cell, and when the physical shared channel scheduled by each downlink control channel is included in a given range, the control section 210 may determine a physical shared channel to be transmitted based on at least one of terminal capability and priority of each physical shared channel.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
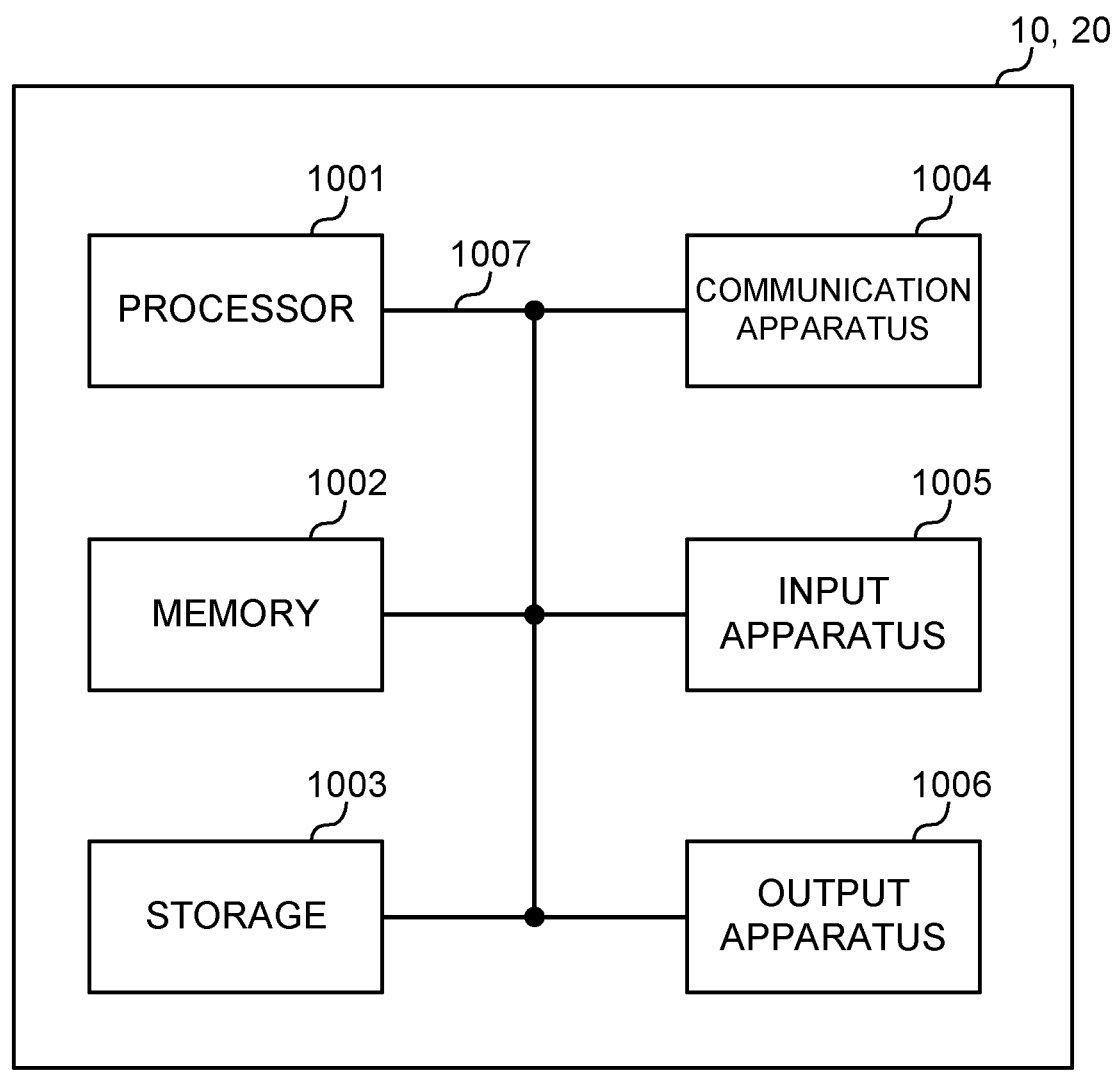
FIG. 14 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 14 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like. In addition, "assuming" may be interpreted as "applying."

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives information on a scheduling type applied to a primary cell; and
a processor that determines, based on the information on the scheduling type, a cell that transmits a downlink control channel that includes a 3-bit Carrier Indicator Field for scheduling the primary cell, and
wherein when a scheduling type in which scheduling is performed by another secondary cell is configured for the primary cell, the primary cell and the another secondary cell are included in a same frequency range.

2. The terminal according to claim 1, wherein when the primary cell is configured as a scheduled cell which is scheduled by the another secondary cell, the primary cell is scheduled by at least one of a downlink control channel on the another secondary cell and a downlink control channel on the primary cell.

3. The terminal according to claim 1, wherein when a scheduling type in which scheduling is performed by the another secondary cell is configured for the primary cell, the primary cell and the another secondary cell are included in a same cell group that is an MCG.

4. A radio communication method for a terminal, comprising:
receiving information on a scheduling type applied to a primary cell; and
determining, based on the information on the scheduling type, a cell that transmits a downlink control channel that includes a 3-bit Carrier Indicator Field for scheduling the primary cell, and
wherein when a scheduling type in which scheduling is performed by another secondary cell is configured for the primary cell, the primary cell and the another secondary cell are included in a same frequency range.

5. A base station comprising:
a transmitter that transmits information on a scheduling type applied to a primary cell; and
a processor that indicates, based on the information on the scheduling type, a cell that transmits a downlink control channel that includes a 3-bit Carrier Indicator Field for scheduling the primary cell, and
wherein when a scheduling type in which scheduling is performed by another secondary cell is configured for the primary cell, the primary cell and the another secondary cell are included in a same frequency range.

6. A system comprising a terminal and a base station, wherein
the terminal comprises:
a receiver that receives information on a scheduling type applied to a primary cell; and
a processor that determines, based on the information on the scheduling type, a cell that transmits a downlink control channel that includes a 3-bit Carrier Indicator Field for scheduling the primary cell,
wherein when a scheduling type in which scheduling is performed by another secondary cell is configured for the primary cell, the primary cell and the another secondary cell are included in a same frequency range, and
the base station comprises:
a transmitter that transmits the information on the scheduling type; and
a processor that indicates, based on the information on the scheduling type, the cell that transmits the downlink control channel.

* * * * *